US008805782B2

(12) United States Patent
Vasudevan et al.

(10) Patent No.: US 8,805,782 B2
(45) Date of Patent: Aug. 12, 2014

(54) REPRESENTING AN OBJECT AS AN AGGREGATE OF IDENTIFIABLE PARTS SHAREABLE BY USERS OF A COLLABORATION SYSTEM

(75) Inventors: Ramesh Vasudevan, Los Altos, CA (US); Jay Ayres, Waltham, MA (US); Anjani Prathipati, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 274 days.

(21) Appl. No.: 12/500,550

(22) Filed: Jul. 9, 2009

(65) Prior Publication Data
US 2011/0010332 A1    Jan. 13, 2011

(51) Int. Cl.
G06F 7/00        (2006.01)
G06F 17/30       (2006.01)

(52) U.S. Cl.
USPC ........................................... 707/625; 707/638

(58) Field of Classification Search
USPC .................................................. 707/638, 625
See application file for complete search history.

(56) References Cited

U.S. PATENT DOCUMENTS

| 2004/0133589 | A1* | 7/2004 | Kiessig et al. ................ 707/102 |
| 2007/0124373 | A1 | 5/2007 | Chatterjee et al. |
| 2007/0124374 | A1 | 5/2007 | Gopalan et al. |
| 2007/0124375 | A1 | 5/2007 | Vasudevan et al. |
| 2008/0162551 | A1 | 7/2008 | Geyer et al. |

OTHER PUBLICATIONS

Entire Prosecution History of U.S. Appl. No. 12/500,556, filed Jul. 9, 2009 by Ramesh Vasudevan et al.
Entire Prosecution History of U.S. Appl. No. 12/500,561, filed Jul. 9, 2009 by Ramesh Vasudevan et al.
Fabrega, F.J.T. et al. "Copy on Write", Nov. 1, 1995, pp. 29.
"Oracle® Beehive Concepts Release 1 (1.4)", part No. E13794-02, published Dec. 2008, pp. 114.
"The Beehive 1.4 Application Developers Guide", part No. E13800-01, published Sep. 2008, pp. 146.

(Continued)

*Primary Examiner* — Apu Mofiz
*Assistant Examiner* — Jared Bibbee
(74) *Attorney, Agent, or Firm* — Omkar K. Suryadevara; Silicon Valley Patent Group LLP

(57) ABSTRACT

A computer that is programmed with collaboration software receives a change to be made to an object that can be of any type among several predetermined types such as message, document, contact, discussion and meeting. The object is represented as an aggregate of identifiable parts shareable by users, including at least a content part, a lock part, and an access-control part. Each version of the object is represented by a set of identifiers of these parts. In response to receipt of information identifying the change, the computer automatically identifies a specific part to be changed from among multiple parts of the object. Thereafter, the computer automatically creates a new instance of the specific part which contains the change as per the received information. The computer automatically stores a new version of the object as a new set that includes a new identifier of the new instance of the specific part.

16 Claims, 8 Drawing Sheets

(56) References Cited

OTHER PUBLICATIONS

U.S. Appl. No. 12/500,556, pp. 39.
U.S. Appl. No. 12/500,561, pp. 34.
Amendment dated Jun. 1, 2012 in U.S. Appl. No. 12/500,561, pp. 9.
Applicant's Initiated Interview Summary dated Jun. 6, 2012 in U.S. Appl. No. 12/500,561, pp. 3.
Amendment dated Dec. 16, 2012 in U.S. Appl. No. 12/500,556, 12 pages.
Final Office Action dated Mar. 11, 2013 in U.S. Appl. No. 12/500,556, 18 pages.
Office Action dated Sep. 27, 2011 in U.S. Appl. No. 12/500,556, pp. 13.
Amendment dated Jan. 26, 2012 in U.S. Appl. No. 12/500,556, pp. 18.
Office Action dated Oct. 13, 2011 in U.S. Appl. No. 12/500,561, pp. 10.
Amendment dated Jan. 13, 2012 in U.S. Appl. No. 12/500,561, pp. 13.
Final Office Action dated Feb. 3, 2012 in U.S. Appl. No. 12/500,561, pp. 13.
Oracle® Collaboration Suite, Concepts Guide, 10g Release 1 (10.1.2), B25491-03, Jul. 2006, pp. 1-106.
Oracle® Mobile Collaboration, Administrator's Guide, 10g Release 1 (10.1.2), B25478-02, Sep. 22, 2006, pp. 1-148.
Margaret Spencer Dixon "Tips for Using Microsoft Outlook to Manage Your "To-Do" Lists", Spencer Consulting, published 2006, pp. 1-3.
Microsoft Office Online, Microsoft Office Outlook, "Assign a color category to a calendar appointment", May 2009, pp. 1-2.
Microsoft Office Online, Microsoft Office Outlook, "Assign a color category to an email message", May 2009, pp. 1-3.
Microsoft Office Online, Microsoft Office Outlook, "Create a new color category", May 2009, pp. 1-2.
"Organizing Information with Outlook 2007 Categories" excerpted from "Outlook 2007 for Dummies", Feb. 21, 2008, pp. 1-3.
Using Outlook Calendar, believed to be prior to May 31, 2009, pp. 1-32.
Outlook Wise Tips & Tricks, Updating Outlook Categories for Multiple Items, believed to be Jun. 4, 2007, pp. 1-5.
Microsoft Outlook 2003: Sharing your calendar using Microsoft Exchange Server, Mar. 2009, pp. 1-4.
Microsoft Outlook 2003: Opening another user's shared calendar using Microsoft Exchange Server, Oct. 2008, pp. 1.
Amendment dated Jul. 3, 2013 in U.S. Appl. No. 12/500,556, 11 pages.
Interview Summary dated Jul. 25, 2013 in U.S. Appl. No. 12/500,556, 3 pages.
Advisory Action dated Jul. 29, 2013 in U.S. Appl. No. 12/500,556, 4 pages.
Amendment dated Aug. 9, 2013 in U.S. Appl. No. 12/500,556, 14 pages.
Interview Summary dated Aug. 12, 2013 in U.S. Appl. No. 12/500,556, 1 page.
Notice of Allowance dated Oct. 4, 2013 in U.S. Appl. No. 12/500,556, 9 pages.
Amendment dated Feb. 17, 2014 in U.S. Appl. No. 12/500,561, pp. 12.
Notice of Allowance dated Feb. 18, 2014 in U.S. Appl. No. 12/500,556, pp. 7.

* cited by examiner

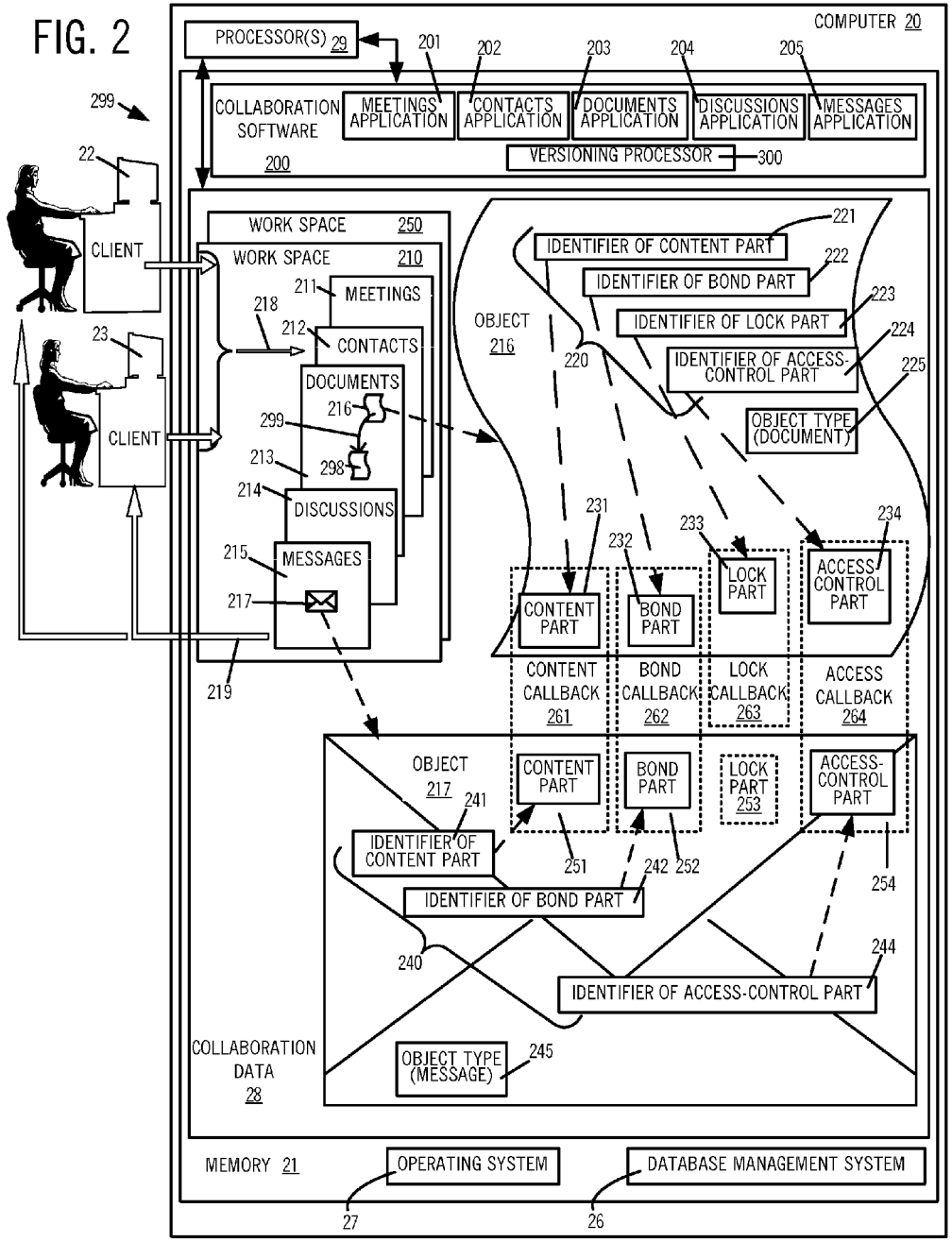

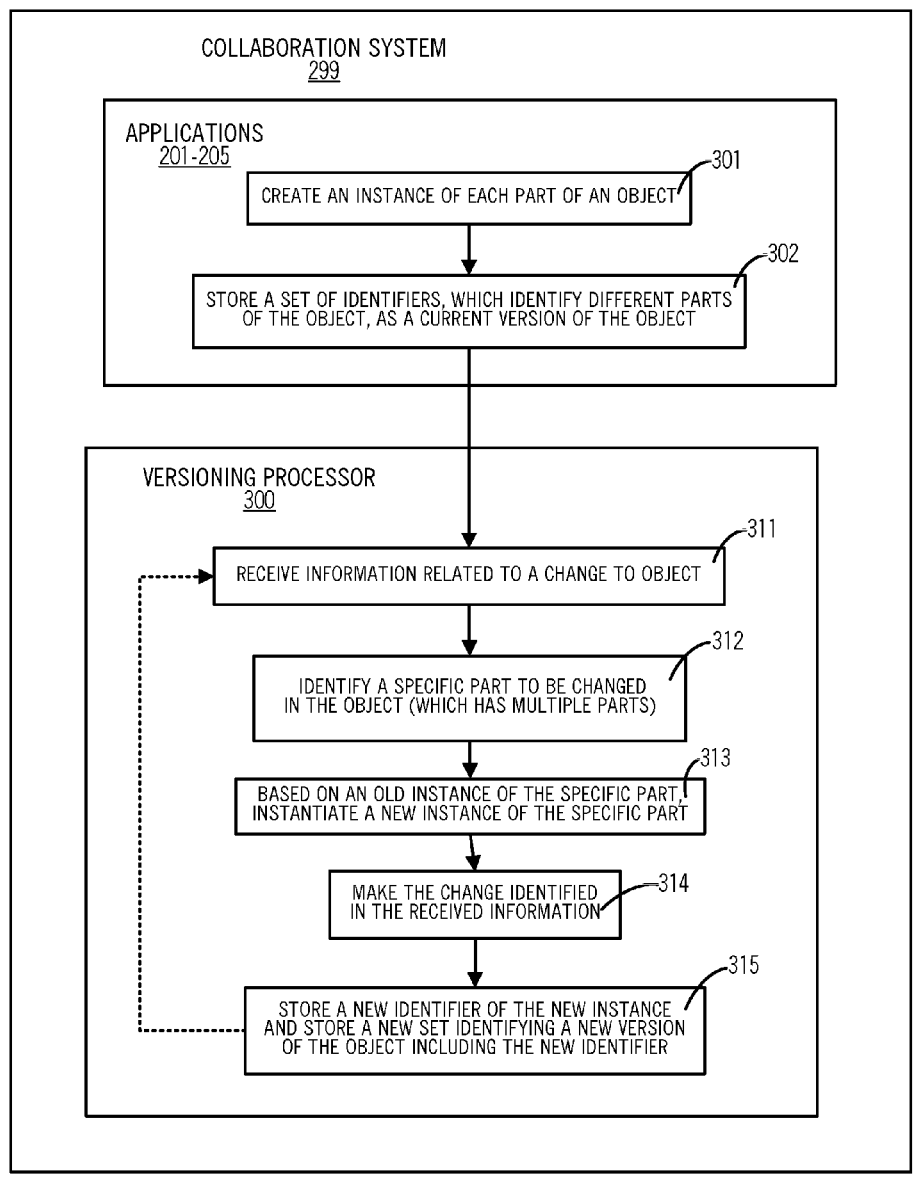

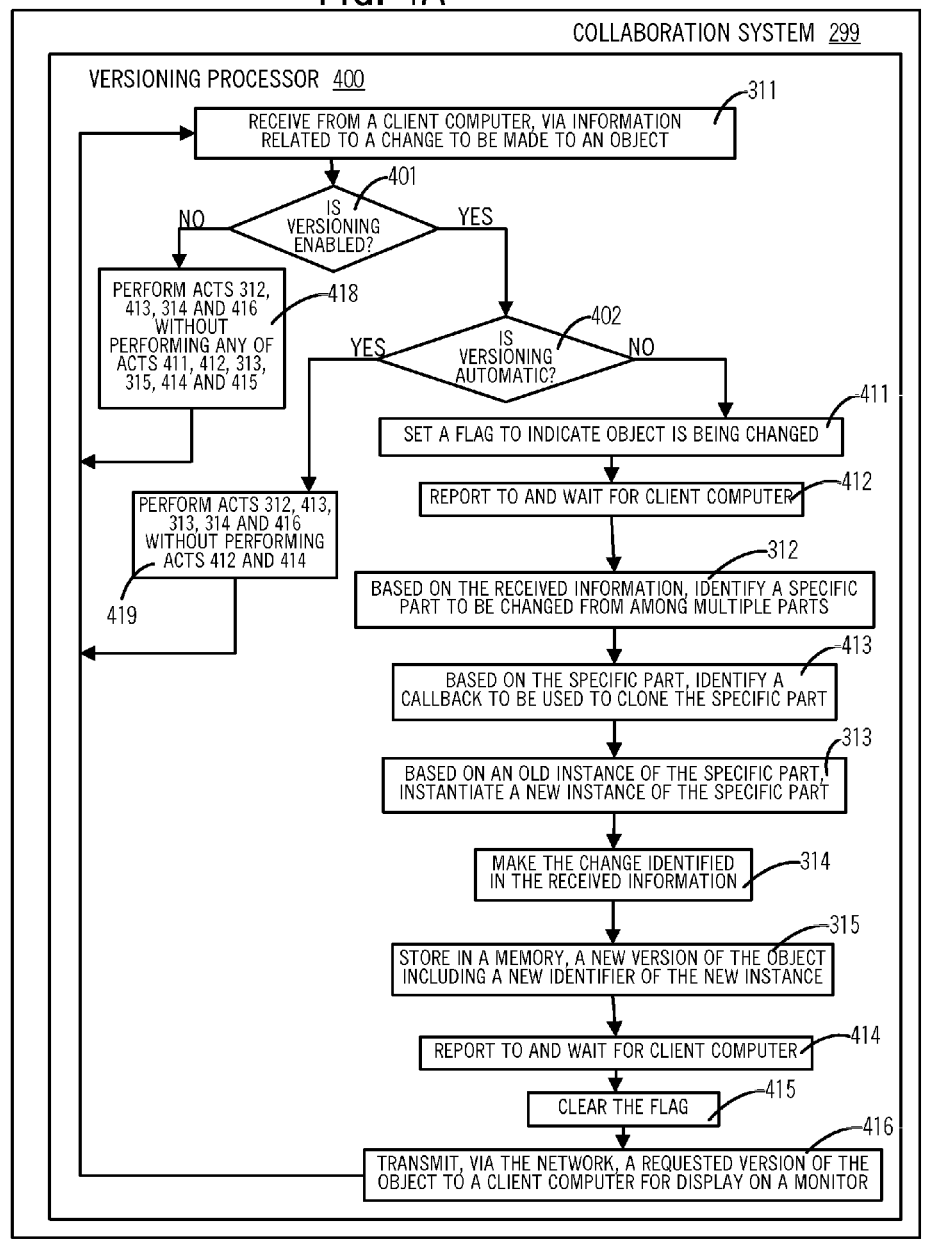

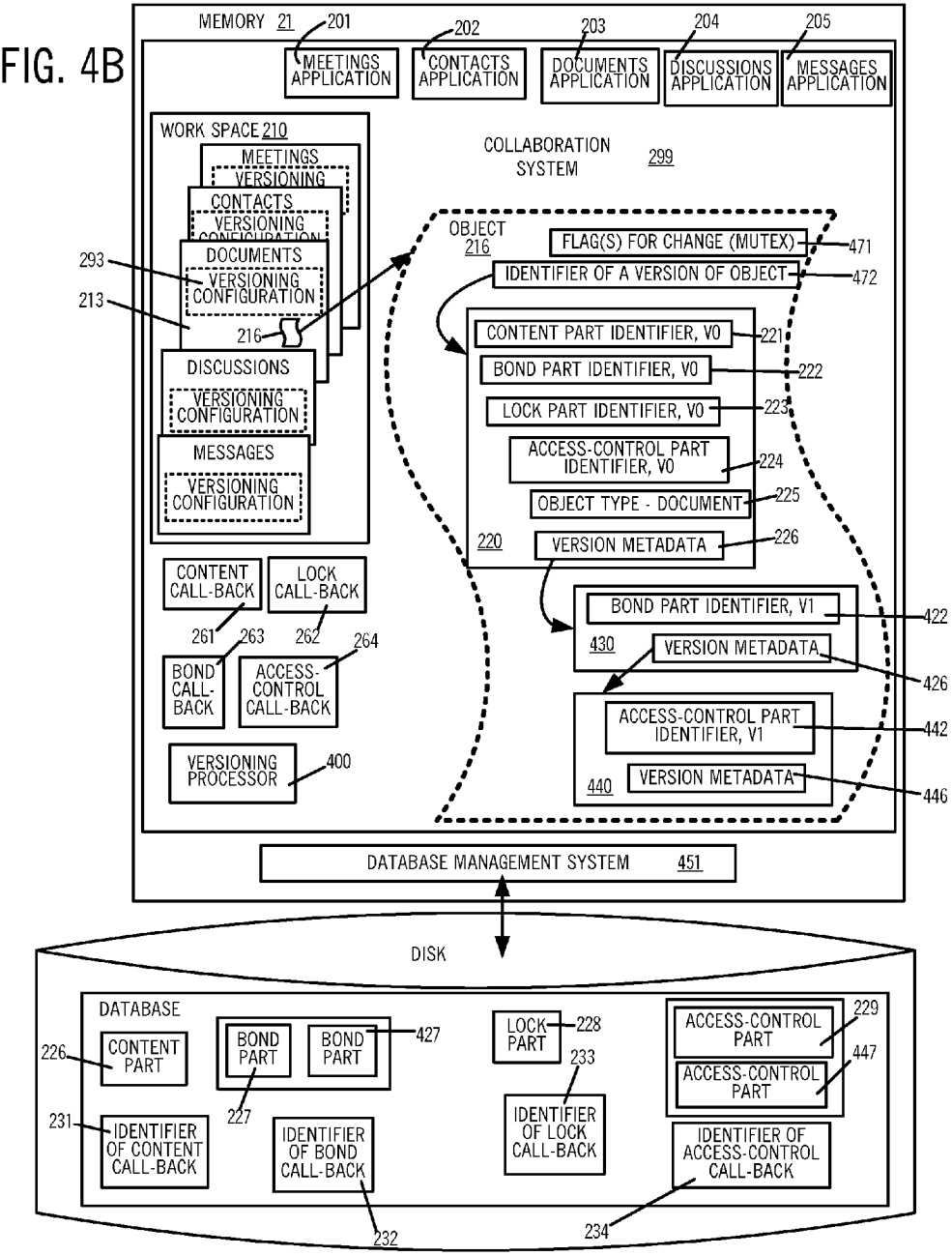

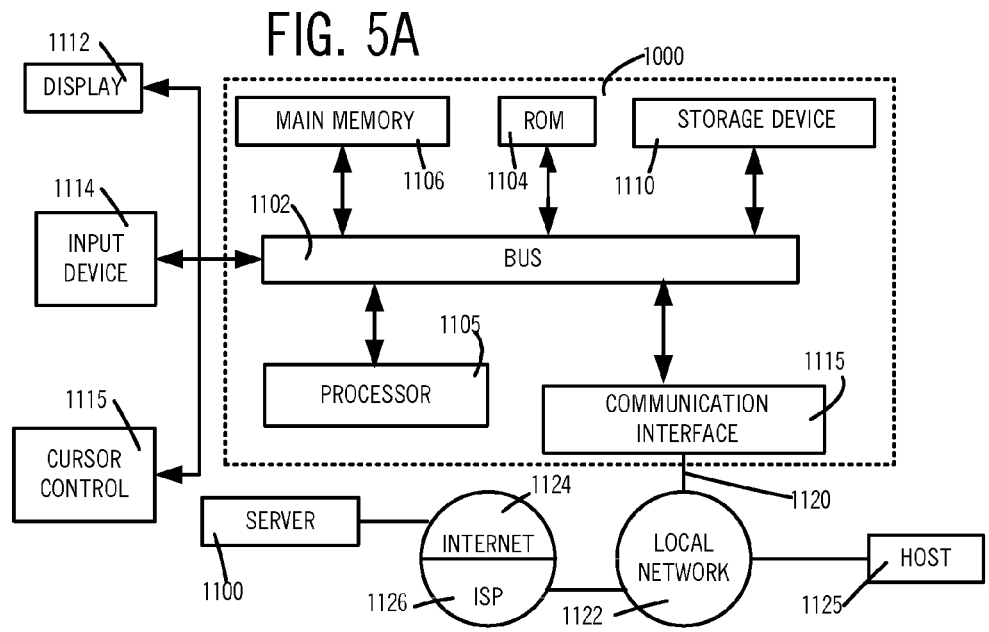
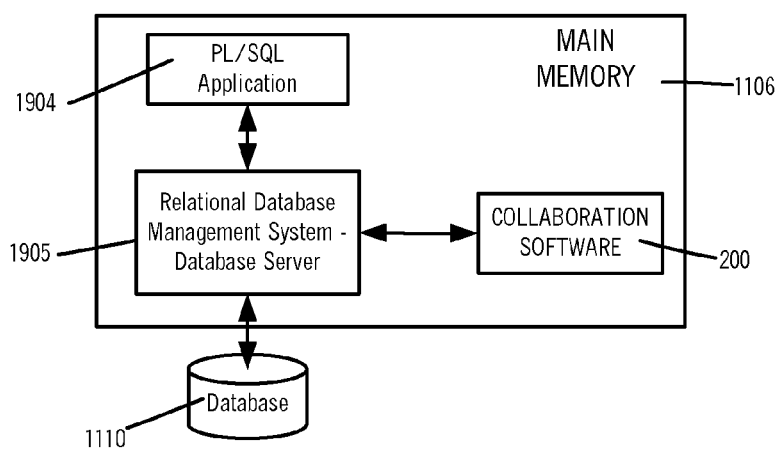

REPRESENTING AN OBJECT AS AN AGGREGATE OF IDENTIFIABLE PARTS SHAREABLE BY USERS OF A COLLABORATION SYSTEM

CROSS-REFERENCE TO RELATED PATENT APPLICATIONS

This patent application is related to and incorporates by reference herein in their entirety the following two patent applications that are jointly owned and concurrently filed herewith:

(1) U.S. application Ser. No. 12/500,561, entitled "SHARED STORAGE OF CATEGORIZATION, LABELING OR TAGGING OF OBJECTS IN A COLLABORATION SYSTEM" by Ramesh Vasudevan et al. and (2) U.S. application Ser. No. 12/500,556, entitled "REPRESENTING ATTACHMENTS OF OBJECTS IN A COLLABORATION SYSTEM USING METADATA COPIES" by Ramesh Vasudevan et al.

BACKGROUND

Computers that execute collaboration software form a system ("collaboration system") that enables users (e.g. humans) to share with one another information, specifically data in the form of objects ("collaboration objects" or "artifacts"). Examples of collaboration objects that users may share include emails, files, contacts, tasks, calendar items, online discussions, notes, etc. Such computers allow a user to specify, for example, that a particular object (e.g. a document) can only be viewed by one group of users, while it can be viewed, modified, and deleted by another group of users.

Referring to FIG. 1, a collaboration environment 100 of the prior art typically includes a server 110 ("collaboration server"), and a plurality of users of clients 120-1 . . . 120-N (120 generally) interconnected via a network 112 such as the Internet, VPN, LAN, WAN or other packet switched interconnection medium. Collaboration server 110 includes a workspace 150 for providing collaborative access to a plurality of applications 130-1 . . . 130-3 (130 generally). Applications 130 provide services to the users of clients 120 via workspace 150 and network 112. Each of the applications 130 has respective storage areas 132-1 . . . 132-3 (132 generally) for storing application data 134, therefore relieving workspace 150 from storing application data 134 on behalf of users.

Workspace 150 of FIG. 1 includes metadata defining the application data 134 stored by applications 130 on behalf of each user of a client 120. The workspace 150 includes properties 160 that define how the users of clients 120 interact with the applications 130. The server 110 also connects to workspace metadata storage 115, which is operable to store the properties 160 of the workspace 150 as a template 118-1 . . . 118-N (118 generally) on a disk volume or other form of workspace metadata storage 115, such as a local storage volume. Such a local storage volume is operable to store both templates and properties of presently instantiated (i.e. live or persistent) workspaces 150. The properties 160 define aspects such as privileges, policies, other users and available applications 130 (services) corresponding to a particular workspace 150. The server 110 is operable to instantiate the templates 118 for generating (e.g. instantiating) a workspace 150 having similar properties. The workspace metadata storage 115 volume may store a plurality of templates 118-1 . . . 118-N corresponding to different workspaces 150.

In prior art collaboration systems of the type shown in FIG. 1, a change to a value of an attribute of an object (e.g. a user's privilege to read and write the object) is typically made by overwriting the existing value with a new value. The inventors of the current patent application believe there is a need for a method and processor of the type described below, to save an existing value being overwritten by versioning the object and its attributes, so that each version is available if needed.

SUMMARY

One or more computers are programmed in accordance with the invention to implement a particular machine which executes software to represent an object ("collaboration object" or "artifact") as an aggregate of parts that are individually readable and writeable by users of a collaboration system. Examples of parts of a collaboration object include a content part, a bond part and an access-control part and each of these parts is included, in some embodiments, in collaboration objects of different types. Specifically, the collaboration objects can be of any type among several predetermined types, such as message, document, contact, discussion and meeting.

In an illustrative embodiment of a collaboration system, each message has a content part, a bond part and an access-control part, and each document has a content part, a bond part and an access-control part, and each contact has a content part, a bond part and an access-control part, and each discussion has a content part, a bond part and an access-control part, and each meeting has a content part, a bond part and an access-control part.

Versioning of a collaboration object in accordance with the invention is implemented by a computer representing each version as a set of identifiers, of individual parts that form a specific version of the object. Accordingly, in response to receipt of information identifying a single change to be made to the specific version of a collaboration object, the collaboration system automatically identifies a single part to be changed within the object, from among multiple parts in a set representing the specific version. Thereafter, the collaboration system automatically creates a new instance of the identified part, and the newly-created instance is updated as per the received information (identifying the change). For example if a user's privilege to access an object is to be changed, from read to read-and-modify, the collaboration system creates a new instance of an access-control part in which the user's privilege is now set to read-and-modify. Then, the collaboration system automatically stores an indication of a new set of part(s) that identifies a new version of the object, including a new identifier of the newly-created and updated instance. Thereafter, the new version is retrieved and supplied to users in the normal manner, e.g. in response to a request for the collaboration object.

In certain embodiments, versioning of an object in a collaboration system is performed incrementally, wherein a new set which indicates the new version of the object contains identifiers ("new identifiers") of parts thereof changed relative to a prior version, and does not contain identifiers ("pre-existing identifiers") of unchanged parts. Instead, pre-existing identifiers are obtained from other set(s) indicating prior version(s), whenever the object is accessed. In several other embodiments, the versioning is performed by cloning the entirety of a current set of identifiers, so that a new set includes all identifiers indicative of all parts of the new version of the collaboration object, i.e. new identifiers as well as pre-existing identifiers.

BRIEF DESCRIPTION OF THE FIGURES

FIG. 2 illustrates, in a block diagram, a server in accordance with the invention that represents an object in a collaboration system as an aggregate of shareable parts.

FIG. 3A illustrates, in a flow chart, a method performed by a versioning processor that is included in a collaboration system of several embodiments of the invention.

FIG. 4A illustrates, in a flow chart, implementation of the method of FIG. 3A which is performed by a versioning processor in several embodiments of the invention.

FIG. 4B illustrates, in a block diagram, another server (similar to the FIGS. 2 and 3B) representing an object as an aggregate of shareable parts, implemented using call-back functions and identifiers of the call-back functions in some embodiments of the invention.

FIGS. 5A and 5B illustrate, in block diagrams, hardware and software portions of a computer that performs the method illustrated in FIG. 3A.

DETAILED DESCRIPTION

Figure 1:
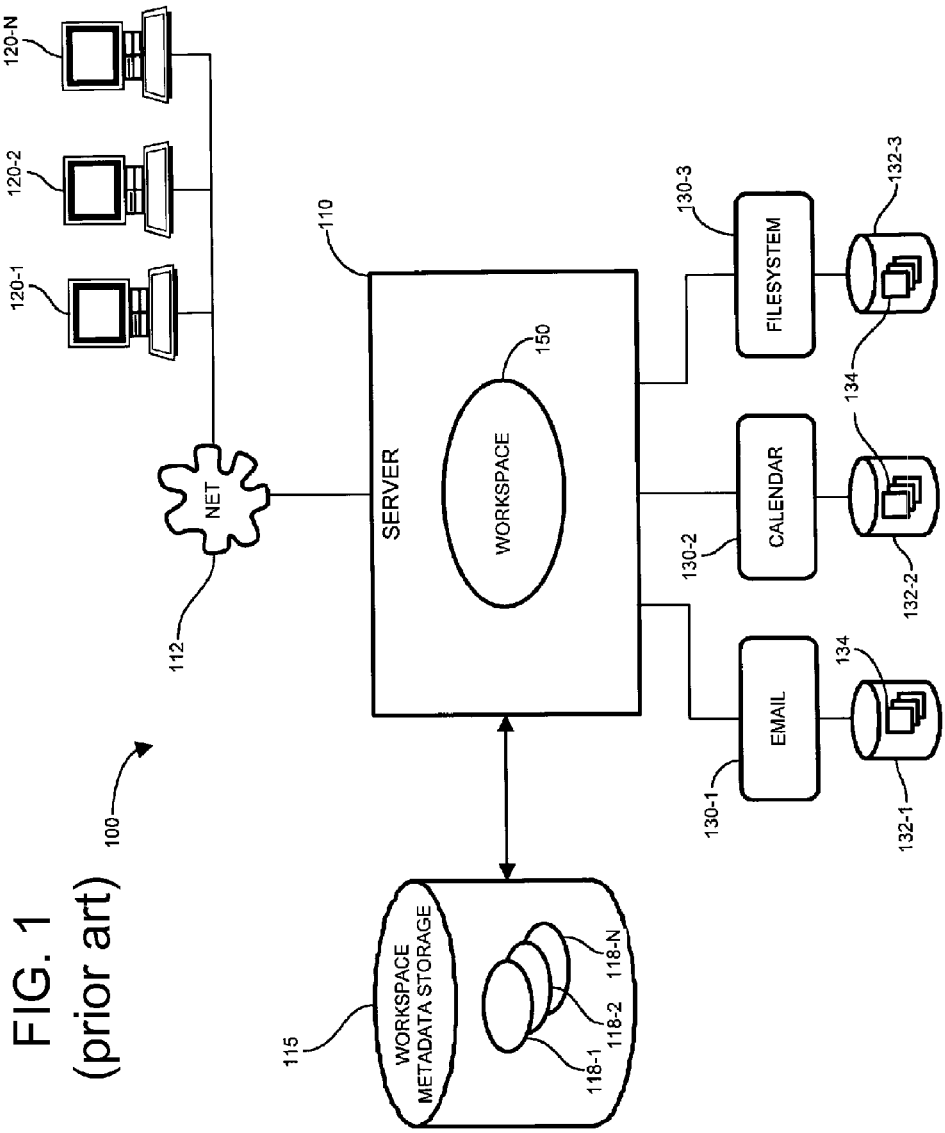
FIG. 1 illustrates, in a block diagram, one example of a collaboration system of the prior art.

Referring to FIG. 2, a computer 20 ("server") is specifically programmed, in some embodiments of the invention, to implement a particular machine which executes collaboration software 200 stored in memory 21 to represent objects 216 and 217 ("collaboration object" or "artifact") as aggregates of parts that are individually and independently accessible to users of client computers 22 and 23. The just-described "aggregate-of-parts" representation supports efficient versioning of objects 216, 217 as follows. Only a specific part of an object which is to be changed is cloned and then changed to form a corresponding part of a new version of the object, while other parts of a prior version of the object are kept unchanged and are identified by reference, as forming additional parts of the new version of the object. Note that the aggregate-of-parts representation of a collaboration object has a drawback which makes collaboration software 200 slower to execute, because run-time access to an object by a computer 22, 23 requires an extra lookup because the object's parts are passed "by reference" rather than being passed "by value" between computer 20 and computers 22 and 23.

An illustrative internal organization of collaboration objects 216, 217 in the particular machine formed by computer 20 of several embodiments, is described below in reference to FIG. 2 followed by a description of an illustrative operation shown in FIG. 3, of a processor 300 when programmed with software implemented as described herein by computer 20. Depending on the embodiment, computer 20 includes one or more processor(s) 29 and a memory 21 (FIG. 2). Processors 29 are dual core processors in CENTRINO DUO® available from Intel Corporation in some embodiments. Note that multiple processors are not a critical aspect of some embodiments, and alternative embodiments are implemented with a single processor 29 in computer 20 that is time-shared by multiple processes (of a collaboration system 299) in the normal manner. Collaboration system 299 is formed by computer 20 executing collaboration software 200 while using collaboration data 28. As will be readily apparent to the skilled artisan, one or more portions of collaboration software 200 and/or collaboration data 28 may be respectively executed by and/or stored in multiple computers that together form a collaboration system in a distributed processing environment.

Memory 21 (FIG. 2) of several embodiments ("first embodiments") includes, in addition to collaboration software 200 and independent therefrom, one or more portions of other software, such as database management software 26 and/or operating system software 27. Specifically, collaboration software 200 of several first embodiments uses one or more services normally provided by database management software 26 and/or operating system software 27. However, collaboration software 200 of certain first embodiments is implemented independent of database management software 26 and/or operating system software 27, depending on the embodiment.

Alternative embodiments of the invention extend other conventional software, e.g. extend database management (DBMS) software and/or operating system (OS) software by integrating therein one or more aspects of collaboration software 200. Hence, OS software 27 (FIG. 2) is itself extended in some alternative embodiments ("second embodiments") by implementing therein ("natively") one or more methods and/or data structures described herein, to support versioning of objects that are shared by multiple users. As another example, DBMS software 26 (FIG. 2) is extended in certain alternative embodiments ("third embodiments") by implementing therein one or more methods and/or data structures described below to support versioning of shared objects. Other embodiments extend both softwares 26 and 27 to implement methods and/or data structures of the type described herein.

In many embodiments of the invention, as illustrated in FIG. 2, collaboration software 200 in memory 21 includes, for example, a meetings application 201, a contacts application 202, a documents application 203, a discussions application 204 and a messages application 205. The just-described applications 201-205 need not be included as portions of collaboration software 200, e.g. if these applications are supported natively by other software, such as such as database management software 26 and/or operating system software 27. Memory 21 also holds data 28 used by collaboration software 200 of several first embodiments, although as noted above such data 28 may be natively used by other software, such as such as database management software 26 and/or operating system software 27 in the second and third embodiments described above.

In some embodiments, data 28 defines one or more workspaces, such as workspaces 210 and 250, through which multiple users share all information related to the objects. For example, a workspace 210 is illustrated in FIG. 2 as receiving information via an input link 218 from client computers 22 and 23 that are connected to computer 20 via a network, such as the Internet. Computer 20 transmits information about one or more objects in workspace 210 to be displayed to the users of client computers 22 and 23 via an output link 219. The objects that are accessible through a workspace can be of any type, selected from among a number of predetermined types supported by collaboration software 200, such as a message type, a document type, a contact type, a discussion type, and a meeting type.

Unless otherwise described explicitly herein, workspaces 210 and 250 are implemented in a manner similar or identical to workspaces described in, for example, the following documents each of which is incorporated by reference herein in its entirety: United States Patent Application Publication 20070124373 by Ramkrishna Chatterjee et al. published May 31, 2007 and entitled "Methods and apparatus for defining a collaborative workspace"; United States Patent Application Publication 20070124374, by Arun Gopalan et al. published May 31, 2007, entitled "Methods and apparatus providing collaborative access to applications."

Referring to FIG. 2, workspace 210 includes several containers 211-215 through which objects in a server are accessible to clients. For example, information related to an object 216 is accessible to users of client computers 22 and 23 in a container 213 in workspace 210 in server computer 20. In this example, object 216 is of type document, container 213 is also of type document, and a corresponding application, namely documents application 203, is used by computer 20 to interface with software in client computers 22 and 23 (e.g. word processing software, such as MICROSOFT WORD available from Microsoft Corporation). As another example, another container 215 in workspace 210 holds another object 216 of type message, and a messages application 205 is used by computer 20 to interface with software in client computers 22 and 23 (e.g. email client software, such as MICROSOFT OUTLOOK available from Microsoft Corporation).

In some embodiments, applications 201-205, which are portions of collaboration software 200, are implemented in a manner similar or identical to software called "Oracle Beehive" as described in, for example, a paper entitled "Oracle® Beehive Concepts Release 1 (1.4)", part number E13794-02, published December 2008 and available from Oracle Corporation of Redwood Shores, Calif. The just-described paper is incorporated by reference herein in its entirety.

In many embodiments of computer 20, a collaboration object ("artifact") is internally represented, in memory 21, as an aggregate of parts that can be accessed and modified independent of one another, and a set of identifiers that uniquely identify these parts constitutes a version of the object. Such identifiers can be, for example, pointers of the type used in the language C or C++ and/or implemented as memory addresses that are either absolute or relative, depending on the implementation. For example, FIG. 2 illustrates a collaboration object 216 which includes a set 220 of identifiers 221-224 that respectively identify corresponding parts 231-234 of object 216. Object 216 of some embodiments has as identifiers, the values of specific memory addresses in memory 21, when object 216 is stored in memory. Alternatively, object 216 may have as identifiers, values of offsets within object 216 from a predetermined location in object 216, depending on the embodiment.

In the above-described example, collaboration object 216 includes an object type 225 that identifies the object as being of type document. As another example, FIG. 2 illustrates another collaboration object 217 which includes its own set 240 of identifiers 241-244 that respectively identify corresponding parts 251-254 of object 217. Collaboration object 217 includes an object type 245 that identifies the object as being of type message. Although not shown in FIG. 2, during normal operation, computer 20 holds numerous such collaboration objects, each of which may be of any type among the predetermined types supported by collaboration software 200, as described above.

In accordance with the invention, collaboration objects of different types (such as document, message, contact, discussion, and meeting) have one or more identical types of parts. For example, a message object has a content part, a document object also has a content part, a contact object also has a content part, a discussion objet also has a content part and a meeting object also has a content part. Referring to FIG. 2, a part 231 of document object 216 is of type content, and message object 217 also has its own part 251 also of type content. As collaboration object 216 is of type document, the corresponding content part 231 holds information similar or identical to information present in a normal document.

For example, if a document encapsulated in collaboration object 216 is a text document, then part 231 includes the specific content of the text document, such as a title, headings, paragraphs, formatting information, header and/or footer etc. An example of part 231 is a wiki page expressed in a markup language, and generated by use of a documents application 203 which may be, for example, software called "MediaWiki" described on Internet at the following URL obtained by replacing the symbol % with the symbol/in the following string www.mediawiki.org%wiki%MediaWiki. Note that object 216 also includes an identifier 221 which uniquely identifies the content part 231 in computer 20, and the identifier 221 is included in a set 220 that indicates a specific version of object 216.

In the example illustrated in FIG. 2, another object 217 is of type message, and accordingly its content part 251 holds information similar or identical to information present in a normal message. For example if the message encapsulated in collaboration object 217 is in a multi-part format, then part 251 includes a header and a body, with the header including the normal fields, such as "From", "To", and "Subject." An example of a multi-part format for messages is MIME which is an abbreviation for the internet standard called "Multipurpose Internet Mail Extensions." Note that object 217 also includes an identifier 241 which uniquely identifies the content part 251 in computer 20, and the identifier 241 is included in a set 240 that indicates a specific version of object 217.

As noted above, collaboration objects 216 and 217 both have corresponding parts 231 and 251 to hold content-specific information of respective types, namely document and message. Some embodiments of computer 20 include in collaboration software 200, a common set of instructions ("callback") to store and retrieve parts of a common type. For example, collaboration software 200 in computer 20 includes a specific sequence of instructions ("content callback") 261 that performs storage and retrieval operations on content parts 231 and 251, and also on the content parts of any other collaboration objects in computer 20. In some embodiments, content callback 261 makes calls to a database management system 26 to store/retrieve content parts 231 and 251 in/from a table ("content table") in a relational database. In this example, the content table holds the content parts 231 and 251 as large objects ("lob"), in the normal manner. Depending on the embodiment, database management system 26 may itself make calls to an operating system 27 in computer 20 to store/retrieve files in a file system.

Referring to FIG. 2, document object 216 further includes another part 232 which is of another type, namely bond type, and part 232 is identified by a corresponding bond part identifier 222 which is also included in object 216. Bond part 232 identifies a relationship 299 between document object 216 and another object 298 in workspace 210, as shown in FIG. 2. For example, if a document stored in content part 231 of object 216 is a request for proposal (RFP), then bond part 232 may identify another object 298 also of type document containing another document (not shown), which may be a proposal under preparation, and responsive to the RFP. Several humans in a sales team may first view, on video monitors of computers 22 and 23, an RFP stored in content part 231, and thereafter lookup the relationship 299 in bond part 232 to obtain an identifier of object 298 that encapsulates the proposal, followed by viewing the proposal itself.

Relationship 299 is implemented in computer 20 in a manner similar or identical to relationships of the type described in the following document which is incorporated by reference herein in its entirety: United States Patent Application Publication 20070124375 by Ramesh Vasudevan et al. published May 31, 2007 and entitled "Methods and apparatus for defining relationships between collaboration entities in a collaboration environment".

Note that message object 217 also has its own bond part 252 which is identified by a corresponding bond part identifier 242 included in set 240. For example, bond part 252 of message object 217 may contain an identifier of document object 216 if the document therein was attached to the message in object 217 (e.g. if the document was forwarded by email). In the example shown in FIG. 2, collaboration software 200 includes another sequence of instructions ("bond callback") 262 that performs storage and retrieval operations on bond parts 232 and 252 and also on the bond parts of any other collaboration objects in computer 20. In some embodiments, bond callback 262 makes calls to a database management system 26 to store/retrieve bond parts 232 and 252 in/from another table ("bond table") in the above-described relational database.

Referring to FIG. 2, document object 216 also includes another part 233, of type lock and this part is identified by a corresponding lock part identifier 223 which is included in object 216. Lock part 233 of some embodiments has a field that identifies one or more owners of a lock placed on object 216. Lock part 233 of several embodiments has a field that identifies a lock type which indicates whether the lock is on a folder or workflow or version. Lock part 233 of certain embodiments has a field that indicates a lock time out, which indicates duration from the current time after which the lock is released automatically by computer 20. The lock part of some embodiments includes a flag indicative of status of change in data. Depending on the embodiment, lock part 233 may include one or more or all of the just-described fields.

In the example shown in FIG. 2, collaboration software 200 includes yet another sequence of instructions ("lock callback") 263 that performs storage and retrieval operations on lock part 233 and also on the lock parts (if any) of any other collaboration objects in computer 20. In some embodiments, lock callback service 263 makes calls to a database management system 26 to store/retrieve lock part 233 in/from yet another table ("lock table") in the above-described relational database.

Note that several embodiments in accordance with the invention do not support locking of message type collaboration objects, such as object 217. In one specific embodiment, a collaboration object which is of type message includes a lock part 253 because lock parts are included in all collaboration objects in computer 20 for the purpose of programming simplicity, although a message's lock part 253 is not used. Specifically, a lock part of a message is not used because in the just-described embodiment, messages in computer 20 are private and immutable after creation, and hence messages do not have a need to be locked. Therefore, lock callback 263 of the just-described embodiment does not use lock part 253 of object 217. Instead, lock callback 263 supports only locking of those objects in computer 20 that can be modified by more than one user after creation, such as documents, folders, workspaces, meetings, contacts, and discussions.

In some embodiments of the invention, lock part 233 identifies multiple users, and all the multiple users are permitted to simultaneously edit or otherwise change one or more parts in object 216. Several embodiments additionally include a lock for each part, to preclude multiple owners from overwriting one another. However other embodiments do not have locks to implement part-level locking, and if the same part is changed by multiple users while object 216 is locked by use of lock part 233, whichever user writes last is successful. Note that unless explicitly stated otherwise herein, locking capabilities of computer 20 are similar or identical to the description provided in a paper entitled "The Beehive 1.4 Application Developers Guide", part number E13800-01 published September 2008 and available from Oracle Corporation of Redwood Shores, Calif. The just-described paper is incorporated by reference herein in its entirety.

In embodiments of the type illustrated in FIG. 2, object 216 also includes yet another part 234, of type access-control and this part is identified by a corresponding identifier 224 which is also included in object 216. Access control part 234 has fields that identify one or more users, and privileges of the identified users for accessing (e.g. to read, modify) object 216. Note that object 217 also has its own access-control part 254 which is identified by the corresponding identifier 244 that is included in object 217. Also, collaboration software 200 includes still another sequence of instructions ("access callback") 264 that performs storage and retrieval operations on access control parts 234 and 254 and also on the access control parts of any other collaboration objects in computer 20. In some embodiments, access callback 262 makes calls to a database management system 26 to store/retrieve access control parts 234 and 254 in/from another table ("access-control table") in the above-described relational database.

Callbacks 261-264 are implemented in collaboration software 200 of some embodiments as PL/SQL functions that store respective parts 231-234 and 251-253 on a non-volatile storage device such as a magnetic hard disk by use of a relational database of the type available from Oracle Corporation. Clients 22 and 23 access any part of different types of objects in collaboration data 28 through a common set of callbacks 261-264, shown in FIG. 2 for illustrative purposes as being located between objects 216 and 217 although as noted above, callbacks 261-264 are implemented in collaboration software 200.

Although only three parts of types that are common to two objects are illustrated in FIG. 2 and described above, as will be readily apparent to the skilled artisan in view of this disclosure, collaboration software 200 supports many more such common types parts and/or further supports one or more different types of objects. Furthermore, although certain common types of parts of collaboration objects have been described above and illustrated in FIG. 2, certain collaboration objects in some embodiments have additional parts that are not of a type common across all types of collaboration objects.

In several embodiments, collaboration objects of the kind described above also have additional identifiers, of the additional parts. For example, in certain embodiments, a document object has additional attributes that are applicable to documents (such as header/footer formatting) but not applicable to messages. Examples of additional attributes of a document object include media type, content encoding, content language and character encoding. Similarly, a message object has its own additional attributes that are uniquely required for messages (such as date/time of sending/receiving) but not required for documents. Examples of additional attributes of a message object include a read-receipt requested flag and the following fields: to, cc, bcc. Accordingly, identifiers of additional parts in collaboration object 216 are also included the set 220 of identifiers (e.g. memory addresses) used by collaboration software 200 to identify a version of the object uniquely within computer 20

In many embodiments of the invention, a processor 300 (called "versioning processor" when programmed in accordance with the invention) implements a copy-on-demand operation on a collaboration object created by an application within collaboration software 200. In the copy-on-demand operation, a user accesses and reads any part of a collaboration object, and no copies of the object are made within collaboration data 28 in computer 20 until the user makes a change to a part at which time a new instance of the part is created to indicate the change (also called "lazy copy"). Alternative embodiments may implement a copy operation on collaboration objects of FIG. 2 in the normal manner, wherein a new instance of each part of the object is created immediately, i.e. during the act of copying a collaboration object (also called "immediate copy" in contrast to "lazy copy").

Referring to FIG. 3A, a collaboration system 299 implements a copy-on-demand operation as follows. A collaboration object is initially created within collaboration data 28 (FIG. 2), by one of applications 201-205 (FIG. 2) performing acts 301 and 302 (FIG. 3A). In act 301, the application creates an instance of each part within the object, followed by act 302 wherein that application stores, as an indication of the current version of the object, a set of identifiers which identify different parts of the object. Note that the specific type of object which is created by acts 301-302 (FIG. 3A) depends on the specific application used to create the object, e.g. a documents application 203 (FIG. 2) is used to initially create document object 216 within data 28 whereas a messages application 205 is used to initially create message object 217.

After a collaboration object is initially created, that object may be modified by any user of client computers 22 and 23 that share workspace 210 (FIG. 2). Specifically, in act 311 (FIG. 3A), versioning processor 300 receives information identifying a change to be made to a collaboration object, such as one of objects 216, 217 (FIG. 2). In response, versioning processor 300 automatically identifies in act 312 (FIG. 3A) a specific part to be changed within the object. The identified part is selected by versioning processor 300 from among multiple parts of object 216 (FIG. 2) based on the received information. For example if a user attaches the document in content part 231 of document object 216 to a message in content part 251 of message object 217, then a bond part 252 of message object 217 is identified in act 312 (FIG. 3A).

After performing act 312 (FIG. 3A), versioning processor 300 performs another act 313, to automatically create a new instance of the identified part, including the change as identified in the received information. Specifically, in act 313, versioning processor 300 automatically creates a new instance of bond part 252 (FIG. 2). Next, in act 314, processor 300 makes a change identified in the information received from the client computer. Specifically, in act 314, processor 200 updates an identifier of document object 216 in the above-described example (in which the user attaches the document in content part 231 to a message in content part 251). Thereafter, in act 315 (FIG. 3A) a new identifier of the new instance is stored in collaboration data 28 (FIG. 2) within memory 21, in a set of identifiers indicative of a new version of message object 217. After act 315, versioning processor 300 returns to act 311 to await receipt of another change to a collaboration object.

Figure 3B:
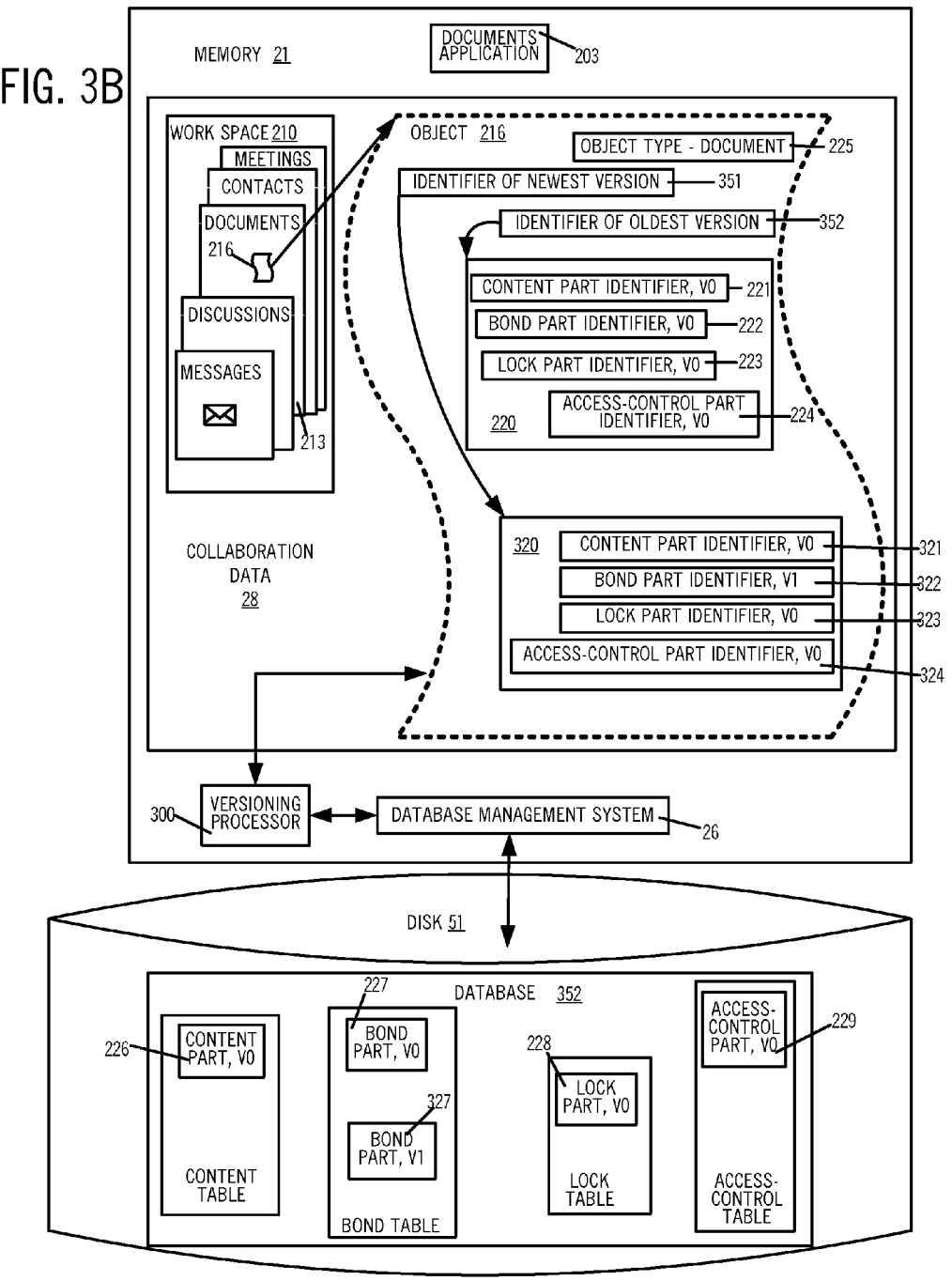
FIG. 3B illustrates, in a block diagram, a server (similar to the FIG. 2) representing an object as an aggregate of shareable parts, implemented using a database management system in some embodiments of the invention.

Collaboration system 299 of FIG. 3B illustrates two versions of document object 216 that are respectively identified by sets 220 and 320, of identifiers of parts of the object that constitute the respective versions. Initially, when object 216 is first created by documents application 203, a set 220 of identifiers 221-224 identifies a version V0 of object 216. In the example of FIG. 3B, set 220 itself is identified in two fields, namely an identifier 351 of the newest version of object 216 and another identifier 352 of the oldest version of object 216. Depending on the embodiment, identifiers 351 and 351 may be included in a data structure (such as an array, a list or a tree) which identifies all versions of object 216, and the data structure itself may be included in object 216. In some embodiments, the data structure is included in a collaboration object only after the object is first changed, when there are two versions (i.e. when there is only an original version, the object does not contain a data structure). Accordingly, any user that has access to object 216 may traverse the tree structure to view each version of object 216, assuming multiple versions exist, as discussed above in reference to FIG. 3A and as further described below for an illustrative example.

In the example illustrated in FIG. 3B, a user of client computer 23 makes a change to the bond part of object 216, e.g. attaches a proposal document to an RFP document (which in turn is identified by content part identifier 231 in object 216). In response to the user's change, versioning processor 300 creates a new version of bond part 327 (e.g. in a bond table in a database 352 which is stored in disk 51). A new identifier 323 of new bond part 327 is included in a set 320 of identifiers of a new version V1 of object 216. Set 320 further includes a content part identifier 321, a lock part identifier 323 and an access-control part identifier 324 each of which have identical values as the corresponding identifiers in the prior version's set 220, i.e. identifiers 221, 223 and 224. Thereafter, identifier 351 of the newest version of object 216 is updated by versioning processor 300, to identify set 320.

Note that version 0 as indicated by set 220 identifies parts 226-229 in database 352 while version 1 as indicated by set 320 identifies parts 226, 327, 228 and 229. Note further that each of sets 220, 320 provides access to the corresponding parts of the respective versions "by reference." As common parts 226, 227 and 229 are identified by both version sets 220 and 320, embodiments illustrated in FIG. 3B require less storage space than an embodiment which has no common parts shared by different versions. In contrast, note that no common parts are shared between versions that are accessible "by value" because each part is cloned when versioning the object.

Moreover, in embodiments of the kind illustrated in FIG. 3B, all pre-existing identifiers are copied from an old version when forming a new version, except for a part identified as being changed for which a new identifier is used in forming the new version. Accordingly, the just-described embodiments illustrated in FIG. 3B implement full versioning of object 216, whereby each version (e.g. indicated by set 320) can be accessed independent of any other version of the object (e.g. indicated by set 220).

Figure 3C:
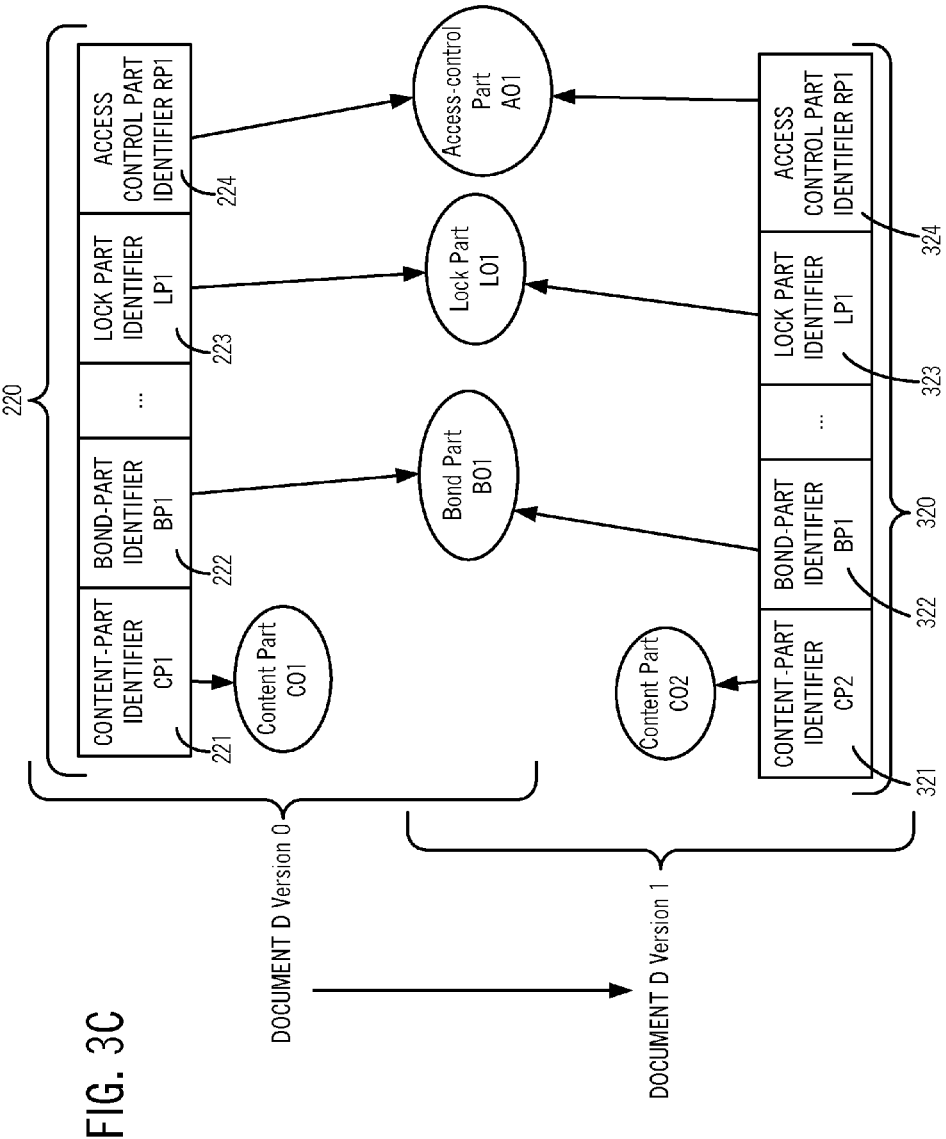
FIG. 3C illustrates, in a block diagram, multiple versions of an object in accordance with the invention.

FIG. 3C shows another example, wherein a document object d of version 0 is created by collaboration system 299 looking up different parts that any document object is made of, and generating instances of the parts, to form the new document object. In the example shown in FIG. 3C, the document object d is formed by creating several parts such as the metadata part MP1, content part CP1, tag applications part TP1, bonds part BP1, and ratings part RP1. Each of these parts is individually identified within collaboration system 299 by a unique identifier so that each part may be independently accessed and/or changed by different computers 22, 23. Moreover, as described above, many of these parts are shared across multiple versions of document object d.

In some embodiments illustrated in FIG. 3C, every attribute of a collaboration object (such as object d) belongs to exactly one part (such as content part identifier CP1), and each part can contain multiple attributes. Specifically, the namespace of attributes of a collaboration object is broken into parts. The distinct set of parts that a collaboration object of a given type is composed of is persistently captured in the collaboration system 299, along with the attributes that belong to each part.

In the example shown in FIG. 3C a change is made to the content in version 0 of Document d, e.g. by editing the document d by use of a documents application (e.g. word processing software, such as Microsoft WORD). The just-described change results in a copy being newly made, of content part CO1, which was referenced by the content part identifier CP1, in a set 220 of document d version 0. The newly made copy is content object CO2, created by invoking a callback that is registered in collaboration software 200 for a content part of a document type object. An identifier CP2 of (e.g. memory address of) newly created content object CO2 is thereafter included in set 320 of a new version 1 of document d, and referred therefrom.

Referring to FIG. 3C, whenever a new version of a collaboration object (such as version 1 of document d) is created from an existing version of the collaboration object (such as version 0 of document d), collaboration system 299 first determines if the new version is being created as a result of a change to one or more of the attributes of the existing version. If the new version is not due to a modification of one of the attributes, the new version of the collaboration object is created as a simple aggregate of the same part identifiers that the existing version of the collaboration object was composed of. For example, set 320 which identifies the parts of version 1 is created as a copy of set 220 which identifies the parts of version 0. Therefore, the values of identifiers 321-324 are same as the values of identifiers 221-224.

If the new version is due to a modification made to one or more attributes of the collaboration object, collaboration system 299 first determines (and identifies) the distinct parts that correspond to the set of attributes being modified. As noted above, in some embodiments, for each of parts CO1, BO1, LO1, and AO1 of a collaboration object, versioning processor 300 looks up a callback registered in collaboration system 299 as being applicable to a specific part type of the part to be instantiated and invokes (e.g. executes) the callback; it is the responsibility of the callback, in these embodiments, to clone the existing version of the part (e.g. CO1 in FIG. 3C) to create a new version of the part, apply the modifications to the new version of the part (e.g. CO2) and return a new identifier CP2 of the new version of the part CO2 to versioning processor 300. Versioning processor 300 then uses this new identifier (e.g. CP2 in FIG. 3C) to compose the new set (e.g. 320) for a new version of the collaboration object.

Regarding callbacks, note that collaboration system 299 of some embodiments, enables each application that creates a part to register a callback for a given application type (e.g. document) and a given part type (e.g. content part). Collaboration system 299 maintains a registry of callbacks that is used subsequently to look up a specific callback to be invoked when the system 299 has to generate a clone, to implement the copy-on-demand scheme. Each callback is responsible for generating a copy in the most efficient manner possible (which, in some cases, is done by only cloning deltas; to restate this point, a part itself is further decomposed into sub-parts, thereby to create efficient copies of the part).

As shown in FIG. 3C, when a change is made to one of the attributes of a version 0 of collaboration object d, a specific part CO1 that contains this attribute is cloned lazily i.e. a copy-on-demand approach is employed to create a copy of the part's original version CO1 and apply the changes, to yield a new version CO2 of that part. All existing references to the part's original version CO1 from other collaboration objects are retained as-is; a set 320 of the new version 1 of collaboration object d is updated to now refer to the newly cloned part CO2.

In some embodiments, when an existing version 0 of a collaboration object d is deleted, collaboration system 299 deletes set 220 of collaboration object d, i.e. deletes identifiers 221-224 that point to the respective parts parts CO1, BO1, LO1, and AO1 of the collaboration object d. If a part CO1 is referenced by other collaboration objects in collaboration system 299, only the identifier 221 which references the part CO1 is deleted when the version 0 of collaboration object d is deleted. Any of these parts (e.g. BO1, LO1, and AO1) is not referenced by any other collaboration object in collaboration system 299, then system 299 physically purges those parts (e.g. releases the space occupied by the purged part in memory 21 to the operating system, to enable the memory's reuse in the normal manner).

Certain implementation details of the embodiments illustrated in FIG. 3A are further illustrated in FIG. 4A. Specifically, as shown in the method of FIG. 4A, certain embodiments of a versioning processor 400 in a server computer check, in act 401, whether versioning is enabled. If versioning is not enabled, then the processor 400 goes to operation 418 wherein certain acts are performed to overwrite a preexisting part in the object with the change to be made. Specifically, in one illustrative embodiment of act 418, processor 400 performs acts 312, 413, 314 and 416 without performing acts 411, 412, 313, 315, 414 and 415. On completion of operation 418, processor 400 returns to act 311.

In act 401, if processor 400 finds that versioning is enabled, then processor 400 goes to act 402 to check is versioning is to be performed automatically or manually. Hence, a mode of versioning, of objects in a collaboration system 299, is determined in act 402. In certain embodiments, an indication of versioning mode is included in configuration data related to versioning ("versioning configuration"). Specifically, versioning configuration is associated with each of multiple containers in a workspace. For example, workspace 210 (FIG. 4B) has a documents container 213 that has its own version configuration 293. Version configuration 293 (FIG. 4B) contains a flag (not shown) which indicates whether the versioning mode, for all objects in a given container, is automatic or manual.

Referring to FIG. 4A, if act 402 indicates the mode is manual, then "NO" branch is taken from act 402, and act 411 is performed wherein a flag is checked and set indicating that the change is being made to certain collaboration data in the server computer in response to a user request from a client computer. Note that if the just-described flag is already set on entering act 411 then no change is permitted to the collaboration object d. Accordingly, if the flag is set on entering act 411, the user is notified that another user is currently changing the collaboration object d and to re-try in future.

If on entering act 411 the flag was not previously set then the flag is set, and act 412 is performed wherein processor 400 reports to the client computer that the collaboration object d may be now changed and then waits for the client computer to respond with changes to be made to the collaboration object d. Next, on receipt of the changes from the client computer, processor 400 performs act 312 in the above-described manner. Thereafter, in act 413, processor 400 identifies the callback for cloning the part being changed, e.g. based on a type of the part to be cloned. Thereafter, acts 313, 314 and 315 are all performed by processor 400, in the above-described manner. Next, in act 414, processor 400 notifies the client computer that the requested change has been made to collaboration object d and then waits for the client computer to provide further instructions.

Thereafter, in act 415, if a client computer's instructions indicate that there are no further changes to collaboration object d, processor 400 clears the previously-set flag and proceeds to act 416. In act 415, if there are further changes to be made, processor 400 returns to act 312. In act 416, processor 400 reads the new version of the collaboration object d from its memory and transmits the new version to the client computer which requested the changes. The object's new version is transmitted by processor 400 to a client computer 22, via a network, and thereafter the computer 22 displays at least some information about the object on a video monitor of computer 22. In processor 400, control returns from act 416 to act 311 (described above). At this stage, in response to a request from a client computer to read any specified version of the object, processor 400 retrieves the specified version from its memory and transmits the specified version to the requesting client computer.

FIG. 4B illustrates an alternative embodiment wherein a new version of a collaboration object in system 299 does not include any pre-existing identifiers from an old version. For example, a set 430 of identifiers only includes a single identifier, namely bond part identifier 422 which identifies bond part 427 which is different from bond part 227. Similarly, another set 440 of identifiers only includes another single identifier, namely access-control part identifier 442 which identifies access-control part 447.

In the example illustrated in FIG. 4B, when a user accesses a collaboration object, one part in the object is identified by an identifier in a new version, and all other parts of the object are identified by use of identifiers in an old version of the object. For this reason, in several embodiments the object is assembled dynamically ("on the fly"), by use of one identifier (e.g. identifier 442 in FIG. 4B) from the new version identified by set 440 and additional identifiers (e.g. identifiers 422, and 221-224) from the older version(s) identified by sets 220 and 430. Multiple versions used to assemble the object are identified by traversing a data structure (such as a tree) which is used to hold identifiers of multiple versions of the object. Note that instead of a separate tree, each version itself includes version metadata (such as metadata 446 in version identified by set 440). Version metadata may hold, for example, an identifier of a prior version (or a next version) of an object.

In some embodiments of the kind illustrated in FIGS. 4A-4B, a versioning configuration is defined for every container in a workspace, and the versioning configuration includes at least the following pieces of information: (1) whether or not to override the versioning configuration from the parent scope or container (not possible if no parent is defined, e.g. for an enterprise); (2) if the parent's configuration is to be overridden: (a) Whether to disable versioning, enable automatic versioning, or enable manual versioning; (b) Whether descendant containers of this container should be allowed to alter this configuration; (3) If either auto or manual versioning is enabled, then the following attributes are also collected: (a) The number of versions to be retained before automatically deleting old versions; (b) The auto-labeling scheme (if any).

In embodiments of the kind illustrated in FIGS. 4A-4B, manual versioning implies the following semantics: (A) whenever an update operation is performed on a collaboration object, an exception is thrown unless the user has explicitly checked out the collaboration object. The update operation is performed on the working copy of the collaboration object, and changes are not propagated to a new version until the user explicitly performs a check in operation. The user also has the option of canceling the checkout. Furthermore, (B) autoversioning implies the following semantics: the check-in and check-out operations are performed in the same (or similar) way that they are performed for manual versioning. In some embodiments, a user is enabled to make changes to a collaboration object without explicitly checking out the collaboration object prior to changing it. In this case, the collaboration object is implicitly checked out automatically, the change is applied, and then the collaboration object is implicitly checked in automatically.

The method of FIG. 3A may be used to program a computer system 1000 of the type illustrated in FIG. 5A which is discussed next. Specifically, computer system 200 includes a bus 1102 (FIG. 5A) or other communication mechanism for communicating information, and a processor 1105 coupled with bus 1102 for processing information. Computer system 1000 uses as its memory 21 (FIG. 2) a main memory 1106, such as a random access memory (RAM) or other dynamic storage device, coupled to bus 1102 for storing information and instructions (e.g. for the method of FIG. 2A) to be executed by processor 1105.

Main memory 1106 also may be used for storing temporary variables or other intermediate information (e.g. objects 216 and 217 shown in FIG. 2) during execution of instructions to be executed by processor 1105. Computer system 1000 further includes a read only memory (ROM) 1104 or other static storage device coupled to bus 1102 for storing static information and instructions for processor 1105, such as collaboration software 200. A storage device 1110, such as a magnetic disk or optical disk, is provided and coupled to bus 1102 for storing information and instructions.

Computer system 1000 may be coupled via bus 1102 to a display device or video monitor 1112 such as a cathode ray tube (CRT) or a liquid crystal display (LCD), for displaying information to a computer user, e.g. the content parts 231 and 251 may be displayed on display 1112. An input device 1114, including alphanumeric and other keys (e.g. of a keyboard), is coupled to bus 1102 for communicating information and changes to objects 216 and 217 to processor 1105. Another type of user input device is cursor control 1116, such as a mouse, a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, versioning of objects in a collaboration system 299 is performed by computer system 1000 in response to processor 1105 executing one or more sequences of one or more instructions for a versioning processor that are contained in main memory 1106. Such instructions may be read into main memory 1106 from another computer-readable storage medium, such as storage device 1110. Execution of the sequences of instructions contained in main memory 1106 causes processor 1105 to perform the operations of a process described herein and illustrated in FIG. 3A. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 1105 for execution. Such a storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

Instead of or in addition to a storage medium, transmission link may be used to provide instructions to processor 1105. A transmission link includes coaxial cables, copper wire and fiber optics, including the wires that comprise bus 1102. A transmission link can also take the form of acoustic or light waves, such as those generated during radio-wave and infra-red data communications, any of which can be used to implement a carrier wave as described herein.

Accordingly, instructions to processor 1105 can be provided by a transmission link or by a storage medium from which a computer can read information, such as data and/or code. Specifically, various forms of transmission link and/or storage medium may be involved in providing one or more sequences of one or more instructions to processor 1105 for execution. For example, the instructions may initially be comprised in a storage device, such as a magnetic disk, of a remote computer. The remote computer can load the instructions into its dynamic memory (RAM) and send the instructions over a telephone line using a modem.

A modem local to computer system 1000 can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer system 1000 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 1000, are exemplary forms of carrier waves transporting the information.

Computer system 1000 can send messages and receive data, including program code, through the network(s), network link 1120 and communication interface 1115. In the Internet example, a server 1100 might transmit information related to objects 216 and 217 retrieved from a distributed database system through Internet 1124, ISP 1126, local network 1122 and communication interface 1115. The instructions for performing the operations of FIG. 3A may be executed by processor 1105 as they are received, and/or stored in storage device 1110, or other non-volatile storage for later execution. In this manner, computer system 200 may obtain the just-described instructions and any related data in the form of a carrier wave.

Note that FIG. 5A is a very low-level representation of many hardware components of a computer system. Several embodiments have one or more additional software components in main memory 1106 as shown in FIG. 5B. Specifically, in such embodiments, computer system 200 of FIG. 5A implements a relational database management system 1905 of the type illustrated in FIG. 5B. Relational database management system 1905 may manage a distributed database system that includes multiple databases, each database being stored on different storage mechanisms.

In some embodiments, the multiple databases are made to appear to an application 1904 as a single database. In such embodiments, an application 1904 can access and modify the data in a database via a network that interconnects them. In other embodiments, an application 1904 interacts with only one database, e.g. database 1110. Database 1110 is controlled by a database management server (DBMS) 1905 which maintains overall consistency of data stored by database 1110. In several embodiments, the DBMS is responsive to commands (also called queries) from application 1904 and/or collaboration software 200 in conformance with a relational database language, the most common of which is the Structured Query Language (SQL). The commands are used by application 1904 of some embodiments to store, modify and retrieve data about objects 216 and 217 in the form of rows in tables in database 1110. The tables have one or more columns and zero or more rows as in a relational database that stores data in the form of tables related to one another.

Relational database management system 1905 further includes an output logic that makes objects 216 and 217 available to a user via a graphical user interface that generates a display on a video monitor 1112. In one example, the output logic provides analysis results via a web-based user interface that depicts information related to a part of a collaboration object and marks thereon any changes to the collaboration object. Additionally and/or alternatively, a database-centric screen is responsive to a command in a command-line interface and displays on a video monitor text information on incoming and/or outgoing flows of information about a collaboration object.

Numerous modifications and adaptations of the embodiments described herein will become apparent to the skilled artisan in view of this disclosure.

Numerous modifications and adaptations of the embodiments described herein are encompassed by the scope of the invention.

What is claimed is:

1. A non-transitory computer-readable storage medium comprising a plurality of instructions to cause a computer to:

receive information identifying a change to an object among a plurality of objects in a memory of the computer;

wherein the object comprises a plurality of parts including at least a content part and an access-control part;

wherein the object further comprises a current set of pre-existing identifiers that uniquely identify in at least the computer, each part in the plurality of parts;

wherein the current set of pre-existing identifiers comprises at least a first identifier of the content part and a second identifier of the access-control part;

wherein a current version of the object identifies the current set of pre-existing identifiers;

wherein the object is of any type selected from at least a message type, a document type, a contact type, a discussion type, or a meeting type;

automatically create a new instance of a specific part including the change identified in the information while at least another part in the plurality of parts is unchanged;

wherein the new instance is created by a function, the function being identified, from among a plurality of functions corresponding to the plurality of parts, based on a specific part type of the specific part to be instantiated; and automatically store in the memory, a new identifier of the new instance;

wherein a new version of the object is identified by a new set of identifiers comprising the new identifier of the new instance and a pre-existing identifier of said another part in the current set.

2. The non-transitory computer-readable storage medium of claim 1 wherein the plurality of instructions further cause the computer to:

set a flag prior the new version being identified; and clear the flag subsequent to the new version being identified.

3. The non-transitory computer-readable storage medium of claim 1 wherein:

the plurality of parts further comprises a bond part and the current set of pre-existing identifiers further comprises a third identifier of the bond part, the bond part identifying another object in the plurality of objects.

4. An apparatus for versioning data, the apparatus comprising a computer, the computer comprising a processor and a memory coupled to the processor, the computer further comprising:

means for receiving a change to an object among a plurality of objects in the memory of the computer;

wherein the object comprises a plurality of predetermined parts including at least a content part, and an access-control part, the object further comprising a plurality of pre-existing identifiers including at least a first identifier of the content part and a second identifier of said access-control part;

wherein the object is of any type selected from at least a message type, a document type, a contact type, a discussion type, or a meeting type;

means for creating, in the memory of the computer, a new instance of a specific part including the change while at least another part in the plurality of predetermined parts is unchanged;

wherein the means for creating comprises a function, the function being identified, from among a plurality of functions, based on a specific part type of the specific part to be instantiated; and means for storing in the memory, a new identifier of the new instance;

wherein a new version of the object is identified by a new set of identifiers comprising the new identifier of the new instance and a pre-existing identifier of said another part in the current set.

5. A computer-implemented method for versioning data, the method comprising:

receiving a change to an object among a plurality of objects in a memory of a computer;

wherein the object comprises a plurality of predetermined parts including at least a content part, and an access-control part, the object further comprising a plurality of pre-existing identifiers including at least a first identifier of the content part and a second identifier of the access-control part;

wherein the object is of any type selected from at least a message type, a document type, a contact type, a discussion type, or a meeting type;

creating, in the memory of the computer, a new instance of a specific part including the change while at least another part in the plurality of predetermined parts is unchanged;

wherein the new instance is created by a function, the function being identified, from among a plurality of functions, based on a specific part type of the specific part to be instantiated; and storing in the memory, a new identifier of the new instance;

wherein a new version of the object is identified by a new set of identifiers comprising the new identifier of the new instance and a pre-existing identifier of said another part in the current set.

6. The non-transitory computer-readable storage medium of claim 1 wherein:

the plurality of parts comprises a lock part and the lock part comprises a flag indicative of status of change in the data.

7. The non-transitory computer-readable storage medium of claim 1 wherein:

the access-control part identifies at least one user privileged to change the data.

8. The apparatus of claim 4 wherein:

the plurality of parts further comprises a bond part and the plurality of pre-existing identifiers further comprises a third identifier of the bond part, the bond part identifying another object in the plurality of objects.

9. The apparatus of claim 4 wherein:

the new version comprises at least one identifier in the plurality of pre-existing identifiers identifying a current version of said data.

10. The method of claim 5 wherein:

the plurality of parts further comprises a bond part and the plurality of pre-existing identifiers further comprises a third identifier of the bond part, the bond part identifying another object in the plurality of objects.

11. The method of claim 5 wherein:

the new version comprises at least one identifier in the plurality of pre-existing identifiers identifying a current version of the data.

12. The method of claim 5 wherein:

the lock part comprises a flag indicative of status of change in the data.

13. The method of claim 5 wherein:

the access-control part identifies at least one user privileged to change the data.

14. The non-transitory computer-readable storage medium of claim 1 wherein:

the new identifier comprises a memory address or an offset from a predetermined location in the memory of the computer.

15. The apparatus of claim 4 wherein:

the new identifier comprises a memory address or an offset from a predetermined location in the memory.

16. The method of claim 5 wherein:

the new identifier comprises a memory address or an offset from a predetermined location in the memory.

\* \* \* \* \*

UNITED STATES PATENT AND TRADEMARK OFFICE
CERTIFICATE OF CORRECTION

| | |
|---|---|
| PATENT NO. | : 8,805,782 B2 |
| APPLICATION NO. | : 12/500550 |
| DATED | : August 12, 2014 |
| INVENTOR(S) | : Vasudevan et al. |

It is certified that error appears in the above-identified patent and that said Letters Patent is hereby corrected as shown below:

In the Specification

In column 8, line 65, delete "20" and insert -- 20. --, therefor.

In column 12, line 7, delete "parts parts" and insert -- parts --, therefor.

Signed and Sealed this
Third Day of March, 2015

Michelle K. Lee
*Deputy Director of the United States Patent and Trademark Office*